(12) United States Patent
Hori et al.

(10) Patent No.: US 10,308,822 B2
(45) Date of Patent: Jun. 4, 2019

(54) THERMOSETTING COATING COMPOSITION

(71) Applicant: KANSAI PAINT CO., LTD., Hyogo (JP)

(72) Inventors: Tsuneaki Hori, Kanagawa (JP); Masami Kobata, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 191 days.

(21) Appl. No.: 15/527,437

(22) PCT Filed: Nov. 19, 2015

(86) PCT No.: PCT/JP2015/082537
§ 371 (c)(1),
(2) Date: May 17, 2017

(87) PCT Pub. No.: WO2016/080483
PCT Pub. Date: May 26, 2016

(65) Prior Publication Data
US 2018/0327613 A1    Nov. 15, 2018

(30) Foreign Application Priority Data

Nov. 19, 2014  (JP) ................................. 2014-234917

(51) Int. Cl.
| | | |
|---|---|---|
| *B32B 15/092* | (2006.01) | |
| *B32B 15/095* | (2006.01) | |
| *B32B 27/38* | (2006.01) | |
| *B32B 27/40* | (2006.01) | |
| *C25D 9/02* | (2006.01) | |
| *C09D 5/44* | (2006.01) | |
| *C09D 163/00* | (2006.01) | |
| *C09D 175/12* | (2006.01) | |
| *C09D 7/40* | (2018.01) | |
| *C08G 18/64* | (2006.01) | |
| *C08G 18/76* | (2006.01) | |
| *C08G 18/80* | (2006.01) | |
| *C08G 59/18* | (2006.01) | |
| *C08G 18/08* | (2006.01) | |
| *C08G 18/28* | (2006.01) | |
| *C08G 59/40* | (2006.01) | |
| *C25D 9/08* | (2006.01) | |
| *C08G 18/73* | (2006.01) | |
| *C08K 5/13* | (2006.01) | |
| *C25D 13/06* | (2006.01) | |

(52) U.S. Cl.
CPC ....... *C09D 5/4465* (2013.01); *C08G 18/0814* (2013.01); *C08G 18/2835* (2013.01); *C08G 18/643* (2013.01); *C08G 18/6407* (2013.01); *C08G 18/7664* (2013.01); *C08G 18/8064* (2013.01); *C08G 59/184* (2013.01); *C08G 59/4028* (2013.01); *C09D 5/44* (2013.01); *C09D 5/4434* (2013.01); *C09D 7/40* (2018.01); *C09D 163/00* (2013.01); *C09D 175/12* (2013.01); *C08G 18/735* (2013.01); *C08G 18/7621* (2013.01); *C08K 5/13* (2013.01); *C25D 13/06* (2013.01)

(58) Field of Classification Search
CPC ..... B32B 15/092; B32B 15/095; B32B 27/38; B32B 27/40; C09D 5/4434; C09D 5/4465; C09D 163/00; C09D 175/12; C25D 9/04; C25D 9/08
USPC ............ 523/427, 428; 428/413, 418, 423.1; 205/317
See application file for complete search history.

(56) References Cited

U.S. PATENT DOCUMENTS

| | | |
|---|---|---|
| 4,419,467 A | 12/1983 | Wismer |
| 4,575,524 A | 3/1986 | Anderson et al. |
| 6,211,305 B1 * | 4/2001 | Hsu ...................... C08G 63/676 525/42 |
| 8,729,196 B2 | 5/2014 | Nishiguchi et al. |
| 2003/0064227 A1 | 4/2003 | Gam |
| 2009/0101512 A1 | 4/2009 | Kubota |
| 2010/0300885 A1 | 12/2010 | Nishiguchi et al. |

(Continued)

FOREIGN PATENT DOCUMENTS

| | | |
|---|---|---|
| CN | 102653657 | 9/2012 |
| CN | 103374287 | 10/2013 |
| CN | 103502367 | 1/2014 |

(Continued)

OTHER PUBLICATIONS

Extended European Search Report dated Jul. 16, 2018 in corresponding European Application No. 15861948.6.

(Continued)

*Primary Examiner* — Michael J Feely
(74) *Attorney, Agent, or Firm* — Wenderoth, Lind & Ponack, L.L.P.

(57) ABSTRACT

An object to be solved by the present invention is to discover a thermosetting coating composition ensuring an excellent finished appearance without a decrease in corrosion resistance, and to provide a coated article with such excellent coating performances. The present invention provides a thermosetting coating composition, comprising a modified epoxy resin (A) resulting from a reaction of an epoxy resin (a1) with a modifier (a2), and optionally with an amine compound (a4); and a blocked polyisocyanate compound (B), the modified epoxy resin (A) comprising, at least in a part of the terminals thereof, a specific organic group, and having a number average molecular weight of 800 to 80,000.

8 Claims, No Drawings

(56) References Cited

U.S. PATENT DOCUMENTS

2012/0222962 A1   9/2012   Nishiguchi et al.
2014/0042031 A1   2/2014   Okada et al.

FOREIGN PATENT DOCUMENTS

| JP | 54-120642 | 9/1979 |
| JP | 58-57422 | 4/1983 |
| JP | 61-176674 | 8/1986 |
| JP | 2003-238650 | 8/2003 |
| JP | 2007-302792 | 11/2007 |
| JP | 2010-095668 | 4/2010 |
| JP | 2011-6655 | 1/2011 |
| JP | 2014-172944 | 9/2014 |
| JP | 2014-214223 | 11/2014 |
| WO | 2012/058657 | 5/2012 |

OTHER PUBLICATIONS

International Search Report dated Feb. 9, 2016 in International (PCT) Application No. PCT/JP2015/082537.

\* cited by examiner

THERMOSETTING COATING COMPOSITION

CROSS-REFERENCE TO RELATED PATENT APPLICATIONS

The present application claims priority to the specification of Japan Patent Application No. 2014-234917 (the entire disclosure of which is incorporated in the present specification by reference) filed on Nov. 19, 2014. The present invention relates to a thermosetting coating composition having an excellent finished appearance without a decrease in corrosion resistance.

TECHNICAL FIELD

Background Art

Heretofore, metal substrates have been coated with various corrosion resistant coating compositions as undercoats. The corrosion resistant coating compositions have been used for various purposes, and corrosion resistant coating compositions with various performances have hitherto been developed.

For example, major performances required for electrodeposition coating compositions, which are used as an undercoat for automotive bodies, automotive parts, and the like, include coating composition stability, throwing power, corrosion resistance, a finished appearance, shock resistance, and adhesiveness with respect to the metal substrate and the topcoating film. In particular, for an automobile body for which a high quality is required, the basic performances, including corrosion resistance, a finished appearance, and the like, are important.

As a method for achieving this object, Patent Document 1 discloses a cationic electrodeposition coating composition capable of improving coating composition stability, a finished appearance, and corrosion resistance, which is obtained by introducing a hydrophilic group (alkylene oxide structure) into an epoxy resin as a substrate resin of the corrosion resistant coating composition. However, in some cases, it is difficult to ensure both corrosion resistance and a finished appearance when the substrate resin is rendered hydrophilic.

Further, Patent Document 2 discloses an anionic electrodeposition coating composition containing a resol-type phenolic resin, which can improve corrosion resistance with respect to a carboxy-containing polyester resin or a cross-linking agent. However, when the coating film was thin, the finished appearance and the corrosion resistance were insufficient in some cases.

CITATION LIST

Patent Documents

Patent Document 1: JP2011-6655A
Patent Document 2: JP2007-302792A

SUMMARY OF INVENTION

Technical Problem

An object to be solved by the present invention is to provide a thermosetting coating composition ensuring an excellent finished appearance without a decrease in corrosion resistance; the thermosetting coating composition is particularly useful for cationic electrodeposition coating.

Solution to Problem

The inventors of the present invention carried out extensive research to attain the above object, and found that the above object can be accomplished by a thermosetting coating composition comprising a modified epoxy resin (A) having a specific organic group, and a blocked polyisocyanate compound (B), wherein the number average molecular weight of the modified epoxy resin (A) is 800 to 80,000. With this finding, the inventors completed the present invention.

Specifically, the present invention provides the thermosetting coating compositions, the methods for forming a coating film, and the coated articles, which are detailed below.

Item 1. A thermosetting coating composition, comprising a modified epoxy resin (A) resulting from a reaction of an epoxy resin (a1) with a modifier (a2), and optionally (if necessary) with an amine compound (a4); and a blocked polyisocyanate compound (B), the modified epoxy resin (A) comprising, at least in a part of the terminals thereof, an organic group represented by Formula (1) or Formula (2) below, and having a number average molecular weight of 800 to 80,000,

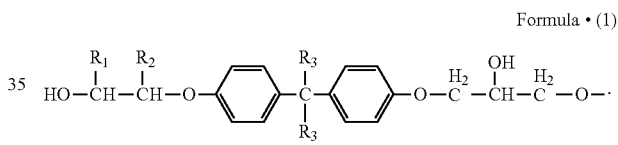

Formula • (1)

wherein $R_1$ and $R_2$ each represent hydrogen, $C_{1-12}$ alkyl, or $C_{1-13}$ alkyloxymethyl; and $R_3$ represents hydrogen or methyl,

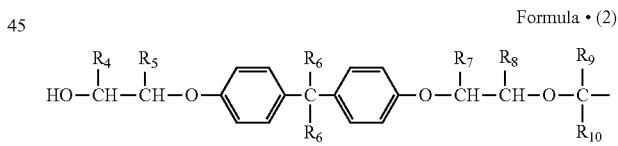

Formula • (2)

wherein $R_4$ and $R_5$ each represent hydrogen, $C_{1-12}$ alkyl, or $C_{1-13}$ alkyloxymethyl; $R_6$ represents hydrogen or methyl; and $R_7$, $R_8$, $R_9$ and $R_{10}$ each represent hydrogen or $C_{1-12}$ alkyl.

Item 2. The thermosetting coating composition according to Item 1, wherein the content ratio of the modified epoxy resin (A) to the blocked polyisocyanate compound (B) is such that the content of the modified epoxy resin (A) is 10 to 90 mass %, and the content of the blocked polyisocyanate compound (B) is 10 to 50 mass %, based on the total mass of resin solids content.

Item 3. The thermosetting coating composition according to Item 1 or 2, further comprising a bisphenol skeleton-containing diol (C) having a molecular weight of 280 to 610 represented by Formula (3) below.

Formula • (3)

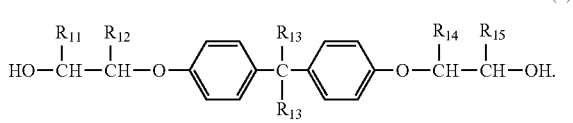

wherein $R_{11}$, $R_{12}$, $R_{14}$ and $R_{15}$ each represent hydrogen, $C_{1-12}$ alkyl, or $C_{1-13}$ alkyloxymethyl; and $R_{13}$ represents hydrogen or methyl.

Item 4. The thermosetting coating composition according to Item 3, wherein the content of the bisphenol skeleton-containing diol (C) is 0.1 to 20 mass %, based on the total resin solids content of the modified epoxy resin (A), the blocked polyisocyanate compound (B), and the bisphenol skeleton-containing diol (C).

Item 5. The thermosetting coating composition according to any one of Items 1 to 4, wherein the modified epoxy resin (A) has amino groups, and is neutralized by an acidic compound.

Item 6-1. A coated article obtained by applying the thermosetting coating composition according to any one of Items 1 to 5 to a metal substrate, followed by thermosetting.

Item 6-2. A coated article having a coating film resulting from thermosetting of the thermosetting coating composition according to any one of Items 1 to 5.

Item 7. A method for forming a cationic electrodeposition coating film, the method comprising immersing a metal substrate in a bath of an electrodeposition coating composition containing the thermosetting coating composition according to any one of Items 1 to 5, and energizing the metal substrate as a negative electrode.

Item 8-1. A coated article obtained by immersing a metal substrate in a bath of an electrodeposition coating composition containing the thermosetting coating composition according to any one of Items 1 to 5, followed by electrodeposition coating and thermosetting.

Item 8-2. A method for forming a coated article, the method comprising immersing a metal substrate in a bath of an electrodeposition coating composition containing the thermosetting coating composition according to any one of Items 1 to 5; subjecting the immersed metal substrate to electrodeposition coating; and subjecting the electrodeposition-coated metal substrate to thermosetting.

Advantageous Effects of Invention

The thermosetting coating composition of the present invention makes it possible to obtain excellent coating surface smoothness without decreasing corrosion resistance, and is particularly useful for cationic electrodeposition coating. Specifically, an automobile body coated with the coating composition according to the present invention has a desirable finished appearance of the coating film and experiences less deterioration due to corrosion even after long periods of driving in environments where snow-melting salt has been applied.

DESCRIPTION OF EMBODIMENTS

The thermosetting coating composition of the present invention comprises a modified epoxy resin (A) having a specific organic group, and a blocked polyisocyanate compound (B).

Hereinbelow, an embodiment of the present invention is described in detail.

The present invention is not limited to the embodiment below, and should be regarded as including various modifications within a scope in which the gist of the present invention is retained.

Modified Epoxy Resin (A)

The modified epoxy resin (A) usable in the present invention comprises, at least in a part of the terminals thereof, an organic group represented by Formula (1) or Formula (2) below.

Formula • (1)

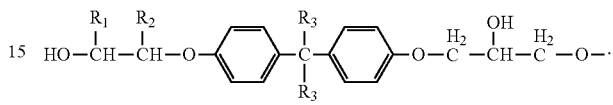

wherein $R_1$ and $R_2$ each represent hydrogen, $C_{1-12}$ alkyl, or $C_{1-13}$ alkyloxymethyl; and $R_3$ represents hydrogen or methyl.

Formula • (2)

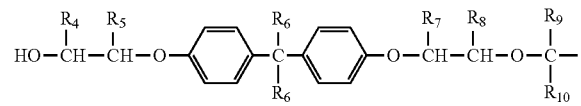

wherein $R_4$ and $R_5$ each represent hydrogen, $C_{1-12}$ alkyl, or $C_{1-13}$ alkyloxymethyl; $R_6$ represents hydrogen or methyl; and $R_7$, $R_8$, $R_9$, and $R_{10}$ each represent hydrogen or $C_{1-12}$ alkyl.

In the present invention, examples of $C_{1-12}$ alkyl include $C_{1-12}$ linear or branched-chain alkyl groups, such as methyl, ethyl, n-propyl, isopropyl, n-butyl, tert-butyl, n-pentyl, n-hexyl, n-heptyl, n-octyl, n-nonyl, n-decyl, n-undecyl and dodecyl.

Examples of $C_{1-13}$ alkyloxymethyl include alkyloxymethyl groups having, as the alkyloxy moiety, a linear or branched-chain $C_{1-12}$ alkyloxy group, such as methoxymethyl, ethoxymethyl, n-propoxymethyl, isopropoxymethyl, n-butoxymethyl, tert-butoxymethyl, n-pentyloxymethyl, n-hexyloxymethyl, n-heptyloxymethyl, n-octyloxymethyl, n-nonyloxymethyl, decyloxymethyl, undecyloxymethyl, or dodecyloxymethyl.

The modified epoxy resin (A) can be produced by reacting an epoxy resin (a1) with a modifier (a2), and optionally (if necessary) with an amine compound (a4).

The epoxy resin (a1) used for the production of the modified epoxy resin (A) is a compound having at least 1 epoxy group, preferably 2 or more epoxy groups in each molecule, and an epoxy resin having a number average molecular weight of at least 300, preferably 400 to 4,000, further preferably 800 to 2,500, and an epoxy equivalent of at least 160, preferably 180 to 2,500, further preferably 400 to 1,500, is suitable. Examples of such an epoxy resin (a1) include compounds obtained by a reaction of a polyphenol compound and epihalohydrin (e.g., epichlorohydrin).

Examples of polyphenol compounds that can be used for forming the epoxy resin (a1) include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1, 1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

As the epoxy resin obtained by reacting a polyphenol compound with epihalohydrin, a resin represented by Formula (4) below, which is derived from bisphenol A, is particularly preferable.

Formula • (4)

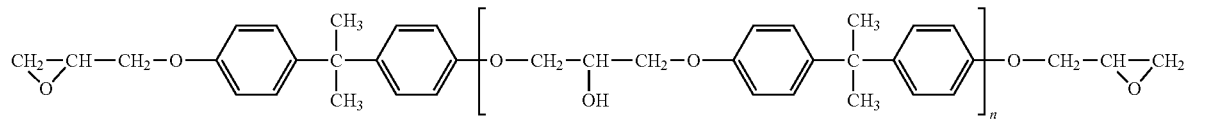

wherein n is preferably 0 to 8.

Examples of commercially available products of the epoxy resin (a1) include products sold under the trade names of jER828EL, jER1002, jER1004, and jER1007 by Mitsubishi Chemical Corporation. The epoxy resin to be used as the epoxy resin (a1) may contain a polyalkylene oxide chain in the resin skeleton.

Examples of the modifier (a2) that can be used for producing the modified epoxy resin (A) include 2,2-bis[4-(2-hydroxy ethoxy)phenyl]propane, 2,2-bis[4-(2-hydroxy propoxy)phenyl]propane, 2,2-bis[4-(2-hydroxy butoxy)phenyl]propane, reaction products of heterocyclic compound (a2-1) and diol compound (a2-2), and reaction products of hydroxy alkyl chloride and diol compound (a2-2). These compounds may be used singly or in a combination of two or more. In particular, a modifier obtained by reacting the heterocyclic compound (a2-1) and the diol compound (a2-2) is preferable.

Examples of the heterocyclic compound (a2-1) include alkylene carbonates, such as ethylene carbonate or propylene carbonate; and alkylene oxides, such as ethylene oxide, propylene oxide or butylene oxide. They may be used singly or in a combination of two or more.

Further, polyphenol compounds, such as bisphenol bisphenol F, or bisphenol E, may be used as the diol compound (a2-2). These diol compounds may be used singly or in a combination of two or more.

The reaction of the heterocyclic compound (a2-1) and the diol compound (a2-2) may generally be performed in an appropriate solvent at about 60° C. to about 250° C., preferably about 70° C. to about 200° C., for about 1 to 25 hours, preferably about 1 to 12 hours. Examples of the solvent include toluene, xylene, cyclohexane, n-hexane, and like hydrocarbon-based solvents; methyl acetate, ethyl acetate, butyl acetate, and like ester-based solvents; acetone, methyl ethyl ketone, methyl isobutyl ketone, methyl amyl ketone, and like ketone-based solvents; dimethyl formamide, dimethyl acetamide, and like amide-based solvents; methanol, ethanol, n-propanol, iso-propanol, and like alcohol-based solvents; ethylene glycol monobutyl ether, diethylene glycol monoethylether, and like ether alcohol-based compounds; and mixtures of these solvents.

By reacting the epoxy resin (a1) with the modifier (a2), it is possible to produce the modified epoxy resin (A), which comprises, at least in a part of the resin terminals thereof, an organic group represented by Formula (1) or Formula (2) above.

The proportion in use of the modifier (a2) is not particularly limited, and can be suitably changed, for example, according to the intended use of the coating composition. From the standpoint of an improved finished appearance and corrosion resistance, the modifier is used in an amount of typically 0.1 to 50 mass %, preferably 1 to 30 mass %, and more preferably 2 to 20 mass %, based on the solids mass of the modifier epoxy resin (A).

Further, a modifier (a3) other than the modifier (a2) may optionally be used.

The modifier (a3) is not limited as long as it is a resin or a compound reactive with the epoxy resin (a1). Examples include polyols, polyether polyols, polyester polyols, polyamidoamines, polycarboxylic acids, fatty acids, polyisocyanate compounds, lactone compounds such as ε-caprolactone, acrylic monomers, compounds obtained by polymerization reaction of acrylic monomers, xylene-formaldehyde compounds, polyphenol compounds, and the like. These modifiers (a3) may be used singly or in a combination of two or more.

The proportion in use of the modifier (a3) is not particularly limited, and can be suitably changed, for example, according to the intended use of the coating composition. The modifier (a3) is preferably used in an amount of typically 30 mass % or less, preferably 20 mass % or less, and more preferably 10 mass % or less, based on the solids mass of the modified epoxy resin (A).

Further, in addition to the modifier (a2) and/or the modifier (a3), it is preferable to use an amine compound (a4) as a compound to be reacted with the epoxy resin (a1) from the standpoint of coating composition stability and a finished appearance.

The amine compound (a4) is not particularly limited insofar as it is an amine compound reactive with the epoxy resin (a1). Examples include mono-alkyl amines or di-alkylamines, such as monomethylamine, dimethylamine, monoethylamine, diethylamine, dipropylamine, dibutylamine, dihexylamine, dioctylamine, monoisopropylamine, diisopropylamine, monobutylamine, monooctylamine, methylbutylamine, and dibutylamine; alkanolamines, such as monoethanolamine, N-methyl ethanolamine, N-ethyl ethanolamine, diethanolamine, mono(2-hydroxypropyl)amine, di(2-hydroxypropyl)amine, N-butylethanolamine, dipropanolamine, monomethylamino ethanol, N-(2-hydroxypropyl)ethylenediamine, 3-methylamine-1,2-propanediol, 3-tert-butylamino-1,2-propanediol, N-methylglucamine, and N-octyl glucamine; alkylene polyamines, such as polymethylenediamine, polyetherdiamine, ethylenediamine, propylenediamine, butylenediamine, hexamethylenediamine, trimethyl hexamethylenediamine, dimethylamino propylamine, diethylenetriamine, diethylamino propylamine, dipropylene triamine, dibutylene triamine, bis(hexamethylene)triamine, bis(4-aminobutyl)amine, triethylenetetramine, tetraethylene pentamine, and pentaethylenehexamine; aromatic or alicyclic polyamines, such as menthenediamine, isophoronediamine, bis(4-amino-3-methylcyclohexyl)methane, meta-xylylene diamine, meta-phenylenediamine, naphthylene diamine, and dimethylamino methylbenzene; polyamines having a heterocyclic ring, such as piperazine, 1-methylpiperazine, 3-pyrrolidinol, 3-piperidinol, and 4-pyrrolidinol; epoxy-added polyamines obtained by adding 1 to 30 moles of an epoxy-containing compound to 1 mole of the polyamines listed above; polyamide polyamines containing at least one primary or secondary amine in the molecule of a polyamide resin generated by condensation of the polyamines listed above with an aromatic acid anhydride, a cyclic aliphatic acid anhydride, an aliphatic acid anhydride, a halogenated acid anhydride, and/or a dimer acid; and ketiminated amines obtained by reacting at least one primary or secondary amine of the polyamines listed above with a ketone compound. These can be used singly or in combination of two or more. Ketone compounds for producing the ketiminated amines described above are not particularly limited as long as the ketone compounds are reactive with a primary or secondary amine of the polyamines described above to transform into a ketimine compound, and can be hydrolyzed in an aqueous coating composition. Examples include methyl isopropyl ketone (MIPK), diisobutyl ketone (DIBK), methyl isobutyl ketone (MIBK), diethyl ketone (DEK), ethyl butyl ketone (EBK), ethyl propyl ketone (EPK), dipropyl ketone (DPK), and methyl ethyl ketone (MEK). Of these, methyl isobutyl ketone (MIBK) is preferable. These ketones can be used singly or in combination of two or more.

The preferable amine value of the modified epoxy resin (A) obtained when the amine compound (a4) is used is typically 20 to 100 mgKOH/g, preferably 30 to 70 mgKOH/g based on the resin solids, in view of improved water dispersibility and corrosion resistance. The modified epoxy resin (A) of the present invention preferably has amino groups and preferably has been neutralized by an acidic compound.

The addition reaction of the modifier (a2), the optionally-used modifier (a3) and/or the amine compound (a4) with respect to the epoxy resin (a1) can typically be performed in a suitable solvent at a temperature of about 80° C. to about 200° C., preferably about 100° C. to about 170° C. for about 1 to 12 hours, and preferably about 1 to 6 hours.

Examples of solvents include hydrocarbon-based solvents, such as toluene, and xylene; ester-based solvents, such as methyl acetate, ethyl acetate, or butyl acetate; ketone-based solvents, such as acetone, methyl ethyl ketone, methyl isobutyl ketone, or methyl amyl ketone; amide-based solvents, such as dimethylformamide or dimethylacetamide; alcohol-based solvents, such as methanol, ethanol, n-propanol, or iso-propanol; ether-alcohol-based compounds, such as ethylene glycol monobutyl ether, or diethylene glycol monoethyl ether; and mixtures thereof.

The preferable modified epoxy resin (A) obtained by the reaction may be rendered a high-purity resin by removing the low-molecular-weight components such as unreacted monomers, modifiers and the like by washing with water or alkaline water, or by being subjected to purification by an extraction using an organic solvent.

The number average molecular weight of the modified epoxy resin (A) is generally 800 to 80,000, preferably 1,000 to 50,000, and more preferably 1,000 to 30,000.

The number average molecular weight and weight average molecular weight in this specification were determined by converting a retention time (retention volume) measured by gel permeation chromatography (GPC) into a polystyrene molecular weight based on the retention time (retention volume) of standard polystyrene with a known molecular weight measured under the same conditions. Specifically, the number average molecular weight and weight average molecular weight can be measured using an HLC8120GPC gel permeation chromatograph (trade name, Tosoh Corporation) and four columns, specifically TSKgel G-4000HXL, TSKgel G-3000HXL, TSKgel G-2500HXL, and TSKgel G-2000HXL (trade names, all from Tosoh Corporation), with mobile-phase tetrahydrofuran at a measurement temperature of 40° C. and a flow rate of 1 mL/min, with a detector RI.

Blocked Polyisocyanate Compound (B)

The blocked polyisocyanate compound (B) is an approximately stoichiometric addition reaction product of a polyisocyanate compound and an isocyanate blocking agent. Known polyisocyanate compounds can be used for the blocked polyisocyanate compound (B). Examples include aromatic, aliphatic, or alicyclic polyisocyanate compounds, such as tolylene diisocyanate, xylylene diisocyanate, phenylene diisocyanate, diphenyl methane-2,2'-diisocyanate, diphenylmethane-2,4'-diisocyanate, diphenyl methane-4,4'-diisocyanate, crude MDI[polymethylene polyphenyl isocyanate], bis(isocyanatemethyl)cyclohexane, tetramethylene diisocyanate, hexamethylene diisocyanate, methylene diisocyanate, or isophorone diisocyanate; cyclopolymers or biuret products of these polyisocyanate compounds; and mixtures thereof.

From the standpoint of corrosion resistance, particularly more preferable polyisocyanate compounds are aromatic polyisocyanate compounds, such as tolylene diisocyanate, xylylene diisocyanate, phenylene diisocyanate, diphenylmethane-2,4'-diisocyanate, diphenyl methane-4,4'-diisocyanate, and crude MDI (preferably crude MDI, and the like).

The isocyanate blocking agent adds to the isocyanate groups of a polyisocyanate compound to block the isocyanate groups. The blocked polyisocyanate compound famed by the addition is stable at room temperature. However, when heated to a baking temperature for the coating film (typically, about 100° C. to about 200° C.), the isocyanate blocking agent preferably dissociates to thereby regenerate free isocyanate groups.

Examples of blocking agents for use in the blocked polyisocyanate compound (B) include oxime-based compounds, such as methyl ethyl ketoxime and cyclohexanone oxime; phenol-based compounds, such as phenol, para-t-butylphenol, and cresol; alcohol-based compounds, such as n-butanol, 2-ethyl hexanol, phenyl carbinol, methylphenyl carbinol, ethylene glycol monobutyl ether, diethylene glycol monoethyl ether, ethylene glycol, and propylene glycol; lactam-based compounds, such as ε-caprolactam and γ-butyrolactam; and active methylene-based compounds, such as dimethyl malonate, diethyl malonate, ethyl acetoacetate, methyl acetoacetate, and acetylacetone (preferably, alcohol-based compounds, and the like).

Bisphenol Skeleton-Containing Diol (C)

The thermosetting coating composition of the present invention preferably comprises a bisphenol skeleton-containing diol (C). The bisphenol skeleton-containing diol (C) is represented by Formula (3) below, and has a molecular weight of 280 to 610.

Formula • (3)

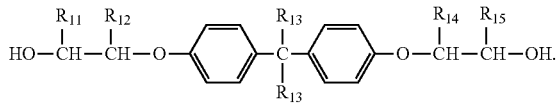

wherein $R_{11}$, $R_{12}$, $R_{14}$ and $R_{15}$ each represent hydrogen, $C_{1-12}$ alkyl, or $C_{1-13}$ alkyloxymethyl; and $R_{13}$ represents hydrogen or methyl.

Examples of the bisphenol skeleton-containing diol (C) include 2,2-bis[4-2-hydroxyethoxy)phenyl]propane, 2,2-bis [4-(2-hydroxypropoxy)phenyl]propane, and 2,2-bis[4-(2-hydroxybutoxy)phenyl]propane. Of these, a bisphenol skeleton-containing diol obtained by reacting the heterocyclic compound (a2-1) with at least one kind of polyphenol compound selected from bisphenol A, bisphenol F, bisphenol E and the like is preferable.

The above reaction can typically be performed in a suitable solvent at a temperature of about 80° C. to about 200° C., preferably about 100° C. to about 170° C. for about 1 to 12 hours, and preferably about 1 to 6 hours.

The bisphenol skeleton-containing diol (C) is generated as a reaction by-product in the synthesis of the modifier (a2), which is to be used as a material of the modified epoxy resin (A), using the heterocyclic compound (a2-1) and the diol compound (a2-2).

The content of the bisphenol skeleton-containing diol (C) generated as a reaction by-product may be determined by quantitative determination using gas chromatography GC-17A (product name, produced by Shimadzu Corporation), and its molecular weight may be measured by the gel permeation chromatograph HLC8120GPC (product name, produced by TOSOH) mentioned above.

From the standpoint of a finished appearance and corrosion resistance, the preferable content of the bisphenol skeleton-containing diol (C) is typically 0.1 to 20 mass %, preferably 0.2 to 10 mass %, and further preferably 0.3 to 5 mass %, based on the total resin solids content of the modified epoxy resin (A), the blocked polyisocyanate compound (B) and the bisphenol skeleton-containing diol (C).

By incorporating the bisphenol skeleton-containing diol (C) into the thermosetting coating composition of the present invention, it becomes possible to improve the finished appearance while maintaining corrosion resistance. Although the reason for this effect is not clarified, the following reason can be assumed.

First, by incorporating a certain amount of a low-molecular-weight compound having desirable affinity (compatibility) with the modified epoxy resin (A), which is the substrate resin, into the coating composition, the finished appearance will improve. Further, since the low-molecular-weight compound has hydroxy groups, it is incorporated into the cross-linkage, and does not affect the corrosion resistance.

Thermosetting Coating Composition

To obtain a coated article having excellent coating composition stability, a finished appearance, and corrosion resistance, the amounts of the modified epoxy resin (A) and the blocked polyisocyanate compound (B) in the thermosetting coating composition of the present invention are preferably such that the amount of the component (A) is typically 10 to 90 mass %, preferably 30 to 85 mass %, and the amount of the component (B) is typically 10 to 50 mass %, preferably 15 to 40 mass % based on the total mass of resin solids content. Having proportions outside the above ranges may adversely affect the coating composition properties or the coating film performance.

The production method for the thermosetting coating composition of the present invention is not particularly limited. For example, the thermosetting coating composition may be obtained by fully mixing the modified epoxy resin (A), the blocked polyisocyanate compound (B) and the optionally-used bisphenol skeleton-containing diol (C), optionally with additives, such as a surfactant, a surface-adjusting agent, and the like, thereby preparing a mixture resin, and further fully mixing optional components, such as a pigment-dispersed paste, water and/or an organic solvent, a neutralizer, and the like with the resin. Known neutralizers may be used as the neutralizer without any particular limitation. In particular, when the modified epoxy resin (A) is a cationic resin, acidic compounds are preferable, and formic acid, lactic acid, and mixtures thereof are particularly preferable.

The pigment-dispersed paste contains a coloring pigment, a rust-preventive pigment, an extender pigment, or the like dispersed therein as fine particles. The paste may be prepared, for example, by blending a pigment dispersion resin, a neutralizer, and a pigment, and subjecting the mixture to dispersion treatment in a dispersing mixer, such as a ball mill, a sand mill, or a pebble mill.

Known resins may be used as the pigment dispersion resin without any particular limitation. Examples of usable resins include epoxy resins, acrylic resins, surfactants, tertiary amine-type epoxy resins, quaternary ammonium salt-type epoxy resins, tertiary sulfonium salt-type epoxy resins, tertiary amine-type acrylic resins, quaternary ammonium salt-type acrylic resins, tertiary sulfonium salt-type acrylic resins, and like resins.

Known pigments may be used without any particular limitation. Examples of usable pigments include coloring pigments, such as titanium oxide, carbon black, and red iron oxide; extender pigments, such as clay, mica, baryta, calcium carbonate, and silica; and rust-preventive pigments, such as aluminum phosphomolybdate, aluminum tripolyphosphate, and zinc oxide (zinc white).

In order to inhibit corrosion or prevent rust, a bismuth compound may be incorporated. Examples of such bismuth compounds include bismuth oxide, bismuth hydroxide, basic bismuth carbonate, bismuth nitrate, bismuth silicate, organic acid bismuth, and the like.

Further, in order to improve the curability of the coating film, an organic tin compound, such as dibutyltin dibenzoate, dioctyltin oxide, or dibutyltin oxide, may be used. However, instead of using these organic tin compounds, the curability of the coating film may also be improved by using the above-mentioned rust-preventive pigment, such as zinc oxide (zinc white) and/or bismuth compound in an appropriate (increased) amount and/or in the form of fine particles. The amount of the pigment to be used is preferably 1 to 100 mass %, and particularly 10 to 50 mass %, based on the total mass of the resin solids content.

Method for Forming Coating Film

In the present invention, the thermosetting coating composition thus obtained may be applied to a metal substrate. Examples of the metal substrate include automobile bodies, automobile parts, motorcycle parts, household appliances, and other appliances. The metal substrate is not particularly limited as long as it is a metal. Examples of metal steel sheets as the metal substrate include cold-rolled steel sheets, alloyed hot-dipped galvanized steel sheets, electro-galvanized steel sheets, electrolytic zinc-iron duplex plated steel sheets, organic composite plated steel sheets, Al materials, Mg materials, and sheets obtained by washing the surfaces of these metal sheets optionally with alkali degreasing or the like, and then optionally subjecting the metal sheets to a surface treatment, such as a phosphate-based conversion treatment or chromate treatment.

Known application methods may be used to apply the coating composition to the substrate without any particular limitation; examples include roller coating, dip coating, barcoater coating, applicator coating, curtain coating, spray coating, rotation atomizing coating, or electrodeposition coating. In the present invention, from the standpoint of, in particular, improved corrosion resistance and a finished appearance of the coating film, it is preferable to use the above thermosetting coating composition for electrodeposition coating. Particularly preferred is a cationic electrodeposition coating film forming method (cationic electrodeposition coating) comprising a step of immersing a metal substrate in an electrodeposition bath containing a cationic coating composition having an amino group-containing epoxy resin, and a step of energizing the metal substrate as a negative electrode.

When the above cationic electrodeposition coating film forming method is adopted, typically, a substrate to be coated is energized as a negative electrode in a bath of the thermosetting coating composition of the present invention diluted with deionized water or the like to achieve the solids content of typically about 5 to 40 mass %, preferably 10 to 25 mass %, with a pH adjusted to 4.0 to 9.0, preferably 5.5 to 7.0, typically at a bath temperature of 15 to 35° C., and a load voltage of 100 to 400 V, and preferably 150 to 350 V. Typically, after the electrodeposition coating is performed, the coated substrate is fully washed with ultrafiltrate (UF filtrate), reverse-osmosis-treated water (RO water), industrial water, pure water, or the like to remove the excess coating composition adhered to the substrate.

The thickness of the coating film is not particularly limited, and is typically within the range of 5 to 40 μm, and preferably 10 to 30 μm, on a dry film basis.

Further, dry curing of the coating film is performed by heating the electrodeposition coating film at a surface temperature of the coated article of 110 to 200° C., and preferably 140 to 180° C., for 10 to 180 minutes, and preferably 20 to 50 minutes, using a dryer such as an electric hot-air dryer or a gas hot-air dryer. The dry curing provides a cured coating film.

EXAMPLES

The present invention is explained in detail below with reference to Production Examples, Examples, and Comparative Examples; however, the present invention is not limited to these Examples. In the Examples, "parts" "and "%" are by mass.

Production of Modified Epoxy Resin (A)

Production Example 1

798.0 parts of bisphenol A and 1.9 parts of potassium hydroxide were placed in an autoclave, and the reaction vessel was purged with nitrogen. 55.0 parts of ethylene oxide was added thereto, and the mixture was slowly heated to about 160° C.; after the reaction, the mixture was cooled and neutralized with concentrated sulfuric acid. Subsequently, 1235.0 parts of jER828EL (product name, produced by Mitsubishi Chemical Corp., epoxy resin, epoxy equivalent=190, number average molecular weight=380) and 0.2 parts of dimethylbenzylamine were added thereto and reacted at 160° C.; subsequently, 53.4 parts of a ketimized product of diethylenetriamine and methyl isobutyl ketone, and 52.5 parts of diethanolamine were added thereto at 120° C., and the mixture was reacted until the epoxy equivalent became 30,000 or more. Ethylene glycol monobutyl ether was further added to obtain an amino group-containing epoxy resin (D-1) solution having a solids content of 80%. The amino group-containing epoxy resin (D-1) had a number average molecular weight of about 2,000 and an amine value of about 30 mgKOH/g. The amino group-containing epoxy resin (D-1) contains about 99% of modified epoxy resin (A-1) having amino groups with a number average molecular weight of 2,000 and an amine value of 30 mgKOH/g, and, as a by-product, about 1% of a bisphenol skeleton-containing diol (C-1) having a number average molecular weight of 300.

Production Examples 2 and 3

Solutions of amino group-containing epoxy resins (D-2) and (D-3) having a solids content of 80% were obtained by the same synthesis as in Production Example 1, except that the formulations shown in Table 1 were applied.

Production Example 4

570.0 parts of jER828EL, 114.0 parts of bisphenol and 0.2 parts of dimethylbenzylamine were added to a reaction vessel, and reacted at 140° C. until the epoxy equivalent became 370. Subsequently, 395.0 parts of 2,2-bis[4-(2-hydroxyethoxy)phenyl]propane was added and reacted at 240° C. Subsequently, 53.4 parts of a ketimized product of diethylenetriamine and methyl isobutyl ketone, and 52.5 parts of diethanolamine were added thereto at 120° C., and the mixture was reacted until the epoxy equivalent became 30,000 or more. Ethylene glycol monobutyl ether was further added to obtain an amino group-containing epoxy resin (D-4) solution having a solids content of 80%. The amino group-containing epoxy resin (D-4) had a number average molecular weight of about 2,000 and an amine value of about 50 mgKOH/g. The amino group-containing epoxy resin (D-4) contains about 89% of a modified epoxy resin (A-4) having a number average molecular weight of 2,200 and an amine value of 34 mgKOH/g, and, as a by-product, about 11% of a bisphenol skeleton-containing diol (C-4) having a number average molecular weight of 300.

Production Examples 5 and 6

Solutions of amino group-containing epoxy resins (D-5) and (D-6) having a solids content of 80% were obtained by the same synthesis as in Production Example 1, except that the formulations shown in Table 1 were applied.

Production Examples 7 and 8

Solutions of amino group-containing epoxy resins (D-7) and (D-8) having a solids content of 80% were obtained by the same synthesis as in Production Example 4, except that the formulations shown in Table 1 were applied.

Production Examples 9 and 10

Solutions of amino group-containing epoxy resins (D-9) and (D-10) having a solids content of 80% were obtained by the same synthesis as in Production Example 4, except that the formulations shown in Table 1 were applied.

Production Example 11

798.0 parts of bisphenol A and 1.9 parts of potassium hydroxide were placed in an autoclave, and the reaction vessel was purged with nitrogen. 55.0 parts of ethylene oxide was added thereto, and the mixture was slowly heated to about 160° C.; after the reaction, the mixture was cooled and neutralized with concentrated sulfuric acid. Subsequently, 1235.0 parts of jER828EL and 0.2 parts of dimethylbenzylamine were added thereto and reacted at 160° C.; subsequently, 53.4 parts of a ketiminized product of diethylenetriamine, and 52.5 parts of diethanolamine were added thereto at 120° C., and the mixture was reacted until the epoxy equivalent became 30,000 or more. Thereafter, the synthesized resin was gradually added to a mixed solvent of ethylene glycol and methanol to make it reprecipitate, and unreacted monomer, low-molecular-weight components and the like were removed. Subsequently, the precipitated resin was removed and ethylene glycol monobutyl ether was added to obtain an amino group-containing epoxy resin (D-11) solution having a solids content of 80%. The amino group-containing epoxy resin (D-11) had a number average molecular weight of about 2,000 and an amine value of about 30 mgKOH/g. The amino group-containing epoxy resin (D-11) contained about 100% of a modified epoxy resin (A-11).

Production Example 12

570.0 parts of jER828EL, 114.0 parts of bisphenol A, and 0.2 parts of dimethylbenzylamine were added to a reaction vessel, and reacted at 140° C. until the epoxy equivalent became 370. Subsequently, 395.0 parts of 2,2-bis[4-(2-hydroxyethoxy)phenyl]propane was added and reacted at 240° C. Subsequently, 53.4 parts of a ketiminized product of diethylenetriamine, and 52.5 parts of diethanolamine were added thereto at 120° C., and the mixture was reacted until the epoxy equivalent became 30,000 or more. Thereafter, the synthesized resin was gradually added to a mixed solvent of ethylene glycol and methanol to make it reprecipitate, and unreacted monomer, low-molecular-weight components and the like were removed. Subsequently, the precipitated resin was removed and ethylene glycol monobutyl ether was added to obtain an amino group-containing epoxy resin (D-12) solution having a solids content of 80%. The amino group-containing epoxy resin (D-12) had a number average molecular weight of about 2,000 and an amine value of about 50 mgKOH/g. The amino group-containing epoxy resin (D-12) contained about 100% of a modified epoxy resin (A-12).

Production Example 13

608 parts of jER828EL, 136.8 parts of bisphenol A, and 0.2 parts of dimethylbenzylamine were added to a reaction vessel, and reacted at 140° C. until the epoxy equivalent became 370. Subsequently, 153.4 parts of 1,6-hexanediol was added and reacted at 240° C. Subsequently, 53.4 parts of a ketiminized product of diethylenetriamine, and 52.5 parts of diethanolamine were added thereto at 120° C., and the mixture was reacted until the epoxy equivalent became 30,000 or more. Ethylene glycol monobutyl ether was further added to obtain an amino group-containing epoxy resin (D-13) solution having a solids content of 80%. The amino group-containing epoxy resin (D-13) had a number average molecular weight of about 2,500. The amino group-containing epoxy resin (D-13) does not contain the modified epoxy resin (A) or the bisphenol skeleton-containing diol (C).

Production Example 14

1140.0 parts of jER828EL, 456.0 parts of bisphenol and 0.2 parts of dimethylbenzylamine were added to a reaction vessel, and the reaction vessel was purged with nitrogen. After nitrogen purging, the reaction vessel was slowly heated to about 160° C. After the reaction, the resulting mixture was cooled and 205.0 parts of diethanolamine was added thereto at 120° C., and the mixture was reacted until the epoxy equivalent became 30,000 or more. Ethylene glycol monobutyl ether was further added to obtain an amino group-containing epoxy resin (D-14) solution having a solids content of 80%. The amino group-containing epoxy resin (D-14) had a number average molecular weight of about 2,000. The amino group-containing epoxy resin (D-14) does not contain the modified epoxy resin (A) or the bisphenol skeleton-containing diol (C).

TABLE 1

| Production Example | | | 1 | 2 | 3 | 4 | 5 | 6 | 7 |
|---|---|---|---|---|---|---|---|---|---|
| Amino Group-containing Epoxy Resin (D) | Name of Resin (D) | | D-1 | D-2 | D-3 | D-4 | D-5 | D-6 | D-7 |
| | Epoxy resin (a1) | jER828EL | 1235 | 1235 | 1235 | 570 | 570 | 570 | 570 |
| | Modifier (a2) | Bisphenol A | 798 | 798 | 798 | 114 | 114 | 114 | 399 |
| | Modifier (a3) | Ethylene Oxide | 55 | | | | | | 55 |
| | | Propylene Oxide | | 72.5 | | | | | |
| | | Butylene Oxide | | | 90 | | | | |
| | | 2,2-bis[4-(2-hydroxyethoxy)phenyl]propane | | | | 395 | | | |
| | | 2,2-bis[4-(2-hydroxypropoxy)pheny]propane | | | | | 430 | | |
| | | 2,2-bis[4-(2-hydroxybutoxy)phenyl]propane | | | | | | 465 | |
| | | 1,6-hexanediol | | | | | | | |
| | Amine Compound (a4) | Ketiminized Product of Diethylene triamine | 53.4 | 53.4 | 53.4 | 53.4 | 53.4 | 53.4 | 53.4 |
| | | Diethanolamine | 52.5 | 52.5 | 52.5 | 52.5 | 52.5 | 52.5 | 52.5 |
| | Molecular Weight (Mn) of Resin (D) | | 2000 | 2000 | 2000 | 2000 | 2000 | 2000 | 1000 |
| Modified Epoxy Resin (A) | Name of Resin (A) | | A-1 | A-2 | A-3 | A-4 | A-5 | A-6 | A-7 |
| | Molecular Weight (Mn) | | 2000 | 2000 | 2000 | 2200 | 2200 | 2200 | 1000 |

TABLE 1-continued

|  |  |  | | | | | | | |
|---|---|---|---|---|---|---|---|---|---|
| Bisphenol Skeleton Diol (C) | Name of Resin (C) | | C-1 | C-2 | C-3 | C-4 | C-5 | C-6 | C-7 |
|  | Molecular Weight (Mn) | | 300 | 350 | 400 | 300 | 350 | 400 | 300 |
| Ratio (A)/(C) in (D) | | | 99/1 | 98/2 | 98/2 | 89/11 | 88/12 | 87/13 | 95/5 |

| | | | Production Example | 8 | 9 | 10 | 11 | 12 | 13 | 14 |
|---|---|---|---|---|---|---|---|---|---|---|
| Amino Group-containing Epoxy Resin (D) | Name of Resin (D) | | | D-8 | D-9 | D-10 | D-11 | D-12 | D-13 | D-14 |
| | Epoxy resin (a1) | jER828EL | | 1710 | 380 | 912 | 1235 | 570 | 608 | 1140 |
| | Modifier (a2) | Bisphenol A | | 1083 | | 319.2 | 798 | 114 | 136.8 | 456 |
| | Modifier (a3) | Ethylene Oxide | | 55 | | | | 55 | | |
| | | Propylene Oxide | | | | | | | | |
| | | Butylene Oxide | | | | | | | | |
| | | 2,2-bis[4-(2-hydroxyethoxy)phenyl]propane | | | 395 | 395 | | 395 | | |
| | | 2,2-bis[4-(2-hydroxy propoxy)pheny]propane | | | | | | | | |
| | | 2,2-bis[4-(2-hydroxy butoxy)phenyl]propane | | | | | | | | |
| | | 1,6-hexanediol | | | | | | | 153.4 | |
| | Amine Compound (a4) | Ketiminized Product of Diethylene triamine | | 53.4 | 53.4 | 53.4 | 53.4 | 53.4 | 53.4 | |
| | | Diethanolamine | | 52.5 | 52.5 | 52.5 | 52.5 | 52.5 | 52.5 | 205 |
| Molecular Weight (Mn) of Resin (D) | | | | 3000 | 1500 | 3000 | 2000 | 2000 | 2500 | 2000 |
| Modified Epoxy Resin (A) | Name of Resin (A) | | | A-8 | A-9 | A-10 | A-11 | A-12 | — | — |
| | Molecular Weight (Mn) | | | 3000 | 1700 | 3200 | 2000 | 2000 | — | — |
| Bisphenol Skeleton Diol (C) | Name of Resin (C) | | | C-8 | C-9 | C-10 | | | | |
| | Molecular Weight (Mn) | | | 300 | 300 | 300 | | | | |
| Ratio (A)/(C) in (D) | | | | 99/1 | 87/13 | 92/8 | 100/0 | 100/0 | 0/0 | 0/0 |

All of the ketiminized products of diethylene triamine in the tables were obtained by ketiminizing a primary amine using methyl isobutyl ketone.

The amino group-containing epoxy resins (D-1) to (D-12) contain the modified epoxy resins (A-1) to (A12). The amino group-containing epoxy resins (D-1) to (D-10) contain, as by-products, bisphenol skeleton-containing diols (C-1) to (C-10). Their contents are shown in the tables as solids ratios.

Production of Bisphenol Skeleton-Containing Diol (C)

Production Example 15

228.0 parts of bisphenol A and 0.6 parts of potassium hydroxide were placed in an autoclave, and the reaction vessel was purged with nitrogen. 92.4 parts of ethylene oxide was added thereto and the reaction vessel was slowly heated to about 160° C. After the reaction, the resulting mixture was cooled and neutralized with concentrated sulfuric acid. Subsequently, ethylene glycol monobutyl ether was added to obtain a bisphenol skeleton-containing diol (C-11) solution having a solids content of 80%. The bisphenol skeleton-containing diol (C-11) had a molecular weight of 316.

Production Example 16

228.0 parts of bisphenol A, 0.7 parts of potassium hydroxide, and 122.0 parts of propylene oxide were placed in an autoclave, and the reaction vessel was purged with nitrogen. After nitrogen purging, the reaction vessel was slowly heated to about 160° C. After the reaction, the resulting mixture was cooled and neutralized with concentrated sulfuric acid. Subsequently, ethylene glycol monobutyl ether was added to obtain a bisphenol skeleton-containing diol (C-12) solution having a solids content of 80%. The bisphenol skeleton-containing diol (C-12) had a molecular weight of 344.

Production Example 17

228.0 parts of bisphenol A, 0.8 parts of potassium hydroxide, and 151.4 parts of butylene oxide were placed in an autoclave, and the reaction vessel was purged with nitrogen. After nitrogen purging, the reaction vessel was slowly heated to about 160° C. After the reaction, the resulting mixture was cooled and neutralized with concentrated sulfuric acid. Subsequently, ethylene glycol monobutyl ether was added to obtain a bisphenol skeleton-containing diol (C-13) solution having a solids content of 80%. The bisphenol skeleton-containing diol (C-13) had a molecular weight of 373.

Production of Blocked Polyisocyanate Compound (B)

Production Example 18

270 parts of Cosmonate M-200 (product name, produced by Mitsui Chemicals, Inc., crude MDI, NCO group content ratio=31.3%) and 127 parts of methyl isobutyl ketone were added to a reaction vessel and heated to 70° C. 236 parts of ethylene glycol monobutyl ether was added dropwise thereto over 1 hour and then heated to 100° C. While the temperature was maintained at 100° C., the reaction mixture was sampled over time to confirm the absence of absorption of unreacted isocyanate groups using infrared spectroscopy, thereby obtaining a blocked polyisocyanate compound (B) solution having a resin solids content of 80%.

Production of Pigment Dispersion Resin

Production Example 19

1010 parts of jER828EL, 390 parts of bisphenol A, 240 parts of PLACCEL 212 (product name, polycaprolactone diol, produced by Daicel Chemical Industries, Ltd., weight average molecular weight=about 1,250), and 0.2 parts of dimethylbenzylamine were added to a flask equipped with a stirrer, a thermometer, a dropping funnel and a reflux condenser, and the mixture was allowed to react at 130° C. until the epoxy equivalent became about 1090. Subsequently, 134 parts of dimethylethanolamine and 150 parts of a 90% aqueous lactic acid solution were added, and the mixture was allowed to react at 120° C. for 4 hours. Subsequently, methyl isobutyl ketone was added to adjust the solids content. A quaternary ammonium salt resin-type pigment dispersion resin solution with a solids content of 60% was thus obtained.

Production of Pigment Dispersion Paste

Production Example 20

8.3 parts (solids content: 5 parts) of the pigment dispersion resin having a solids content of 60% obtained in Production Example 19, 14.5 parts of titanium oxide, 7.0 parts of purified clay, 0.3 parts of carbon black, 1 part of dioctyltin oxide, 1 part of bismuth hydroxide, and 20.3 parts of deionized water were added, and dispersed by a ball mill for 20 hours, thereby obtaining a pigment-dispersed paste with a solids content of 55%.

Production of Thermosetting Coating Composition

Example 1

87.5 parts (solids content: 70 parts) of the amino group-containing epoxy resin (D-1) solution obtained in Production Example 1, and 37.5 parts (solids content: 30 parts) of the blocked polyisocyanate compound (B) solution obtained in Production Example 18 were mixed, and 13 parts of 10% acetic acid was further added thereto. The mixture was uniformly stirred, and then deionized water was gradually added thereto dropwise with vigorous stirring, thereby obtaining an emulsion with a solids content of 34%. Subsequently, 294 parts (solids content: 100 parts) of the emulsion, 52.4 parts (solids content: 28.8 parts) of the 55% pigment-dispersed paste obtained in Production Example 20, and 297.6 parts of deionized water were added thereto, thereby producing a thermosetting coating composition (X-1) having a solids content of 20%.

Examples 2 to 19 and Comparative Examples 1 to 3

Thermosetting coating compositions (X-2) to (X-22) having a solids content of 20% were obtained in the same manner as in Example 1, except that the formulations shown in Table 2 were applied. Further, the below-described evaluation test was conducted. Table 2 shows the results.

TABLE 2

|  |  | Example/Comparative Example ||||||
| --- | --- | --- | --- | --- | --- | --- | --- |
|  |  | Example 1 | Example 2 | Example 3 | Example 4 | Example 5 | Example 6 |
| Name of Thermosetting Coating Composition (X) |  | X-1 | X-2 | X-3 | X-4 | X-5 | X-6 |
| Amino Group-containing Epoxy Resin (D) | Type | D-1 | D-2 | D-3 | D-4 | D-5 | D-6 |
|  | Amount | 70 | 70 | 70 | 70 | 70 | 70 |
| Blocked Polyisocyanate Compound (B) | Amount | 30 | 30 | 30 | 30 | 30 | 30 |
| Bisphenol Skeleton Diol (C) | Type |  |  |  |  |  |  |
|  | Amount |  |  |  |  |  |  |
| Total Amount |  | 100 | 100 | 100 | 100 | 100 | 100 |
| Ratio (A)/(B)/(C) |  | 69/30/1 | 69/30/1 | 69/30/1 | 62/30/8 | 62/30/8 | 61/30/9 |
| Evaluation Results | Finished Appearance | A | A | A | A | A | S |
|  | Corrosion Resistance | S | S | S | S | S | S |

|  |  | Example/Comparative Example |||||
| --- | --- | --- | --- | --- | --- | --- |
|  |  | Example 7 | Example 8 | Example 9 | Example 10 | Example 11 |
| Name of Thermosetting Coating Composition (X) |  | X-7 | X-8 | X-9 | X-10 | X-11 |
| Amino Group-containing Epoxy Resin (D) | Type | D-1 | D-1 | D-1 | D-4 | D-4 |
|  | Amount | 67 | 67 | 67 | 67 | 67 |

TABLE 2-continued

|  |  |  |  |  |  |  |
|---|---|---|---|---|---|---|
| Blocked Polyisocyanate Compound (B) | Amount | 30 | 30 | 30 | 30 | 30 |
| Bisphenol Skeleton Diol (C) | Type | C-11 | C-12 | C-13 | C-11 | C-12 |
|  | Amount | 3 | 3 | 3 | 3 | 3 |
| Total Amount |  | 100 | 100 | 100 | 100 | 100 |
| Ratio (A)/(B)/(C) |  | 66/30/4 | 66/30/4 | 66/30/4 | 59/30/11 | 59/30/11 |
| Evaluation Results | Finished Appearance | S | A | A | S | S |
|  | Corrosion Resistance | S | S | S | A | B |

|  |  | Example/Comparative Example | | | | | |
|---|---|---|---|---|---|---|---|
|  |  | Example 12 | Example 13 | Example 14 | Example 15 | Example 16 | Example 17 |
| Name of Thermosetting Coating Composition (X) |  | X-12 | X-13 | X-14 | X-15 | X-16 | X-17 |
| Amino Group-containing Epoxy Resin (D) | Type | D-4 | D-7 | D-8 | D-9 | D-10 | D-11 |
|  | Amount | 67 | 70 | 70 | 70 | 70 | 70 |
| Blocked Polyisocyanate Compound (B) | Amount | 30 | 30 | 30 | 30 | 30 | 30 |
| Bisphenol Skeleton Diol (C) | Type | C-13 |  |  |  |  |  |
|  | Amount | 3 |  |  |  |  |  |
| Total Amount |  | 100 | 100 | 100 | 100 | 100 | 100 |
| Ratio (A)/(B)/(C) |  | 59/30/11 | 66/30/4 | 69/30/1 | 61/30/9 | 64/30/6 | 70/30/0 |
| Evaluation Results | Finished Appearance | S | S | B | A | A | B |
|  | Corrosion Resistance | B | S | S | A | A | S |

|  |  | Example/Comparative Example | | | | | |
|---|---|---|---|---|---|---|---|
|  |  | Example 18 | Example 19 | Comparative Example 1 | Comparative Example 2 | Comparative Example 3 |
| Name of Thermosetting Coating Composition (X) |  | X-18 | X-19 | X-20 | X-21 | X-22 |
| Amino Group-containing Epoxy Resin (D) | Type | D-12 | D-4 D-13 | D-13 | D-14 | D-13 |
|  | Amount | 70 | 30  40 | 70 | 70 | 67 |
| Blocked Polyisocyanate Compound (B) | Amount | 30 | 30 | 30 | 30 | 30 |
| Bisphenol Skeleton Diol (C) | Type |  |  |  |  | C-11 |
|  | Amount |  |  |  |  | 3 |
| Total Amount |  | 100 | 100 | 100 | 100 | 100 |
| Ratio (A)/(B)/(C) |  | 70/30/0 | 27/30/3 | 0/30/0 | 0/30/0 | 0/30/3 |
| Evaluation Results | Finished Appearance | B | B | B | A | A |
|  | Corrosion Resistance | A | B | C | C | C |

The ratio "(A)/(B)/(C)" in the table denotes calculation results of the solids ratio between the modified epoxy resin (A), the blocked polyisocyanate compound (B), and the bisphenol skeleton diol (C) in the composition.

Production of Test Plates

Onto cold-rolled steel plates (150 mm (length)×70 mm (width)×0.8 mm (thickness)) subjected to chemical conversion treatment with Palbond #3020 (product name, produced by Nihon Parkerizing Co., Ltd., zinc phosphate treating agent) as substrates, the thermosetting coating compositions obtained in the Examples and Comparative Examples were electrodeposited so as to have a dry film thickness of 17 μm. The resulting films were cured by drying at 170° C. for 20 minutes to obtain test plates.

Evaluation Test

Finished Appearance

Using a Surftest 301 (product name, produced by Mitutoyo Corporation, surface roughness tester), the coating films on the test plates were measured for surface roughness (Ra) with a cut-off length of 0.8 mm, and evaluated in accordance with the following criteria. In the evaluation, S to B are considered to be passing, and C is considered to be failing.

S: Surface Roughness (Ra) is less than 0.2.
A: Surface Roughness (Ra) is not less than 0.2 but less than 0.25.
B: Surface Roughness (Ra) is not less than 0.25 but less than 0.3.
C: Surface Roughness (Ra) is not less than 0.3.

Corrosion Resistance

The coating films were cross-cut with a knife so that the cut reached the substrates of the test plates. The test plates were then subjected to a salt spray test at 35° C. for 1,200 hours in accordance with JIS Z-2371. Corrosion resistance was evaluated based on the width of rust and blistering from the cut on one side according to the following criteria.

S to B are considered to be passing, and C is considered to be failing.

S: The maximum width of rust and blistering from the cut on one side is not more than 2.0 mm.
A: The maximum width of rust and blistering from the cut on one side is more than 2.0 mm but not more than 3.0 mm.
B: The maximum width of rust and blistering from the cut on one side is more than 3.0 mm but not more than 3.5 mm.
C: The maximum width of rust and blistering from the cut on one side is more than 3.5 mm.

The invention claimed is:

1. A thermosetting coating composition, comprising a modified epoxy resin (A) resulting from a reaction of an epoxy resin (a1) with a modifier (a2), and optionally with an amine compound (a4); and a blocked polyisocyanate compound (B), the modified epoxy resin (A) comprising, at least in a part of the terminals thereof, an organic group represented by Formula (1) or Formula (2) below, and having a number average molecular weight of 800 to 80,000, Formula • (1)

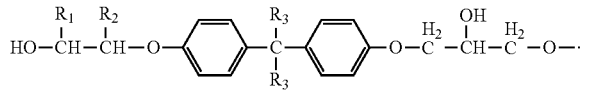

wherein $R_1$ and $R_2$ each represent hydrogen, $C_{1-12}$ alkyl, or $C_{1-13}$ alkyloxymethyl; and $R_3$ represents hydrogen or methyl, Formula • (2)

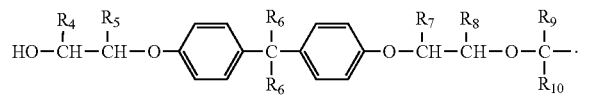

wherein $R_4$ and $R_5$ each represent hydrogen, $C_{1-12}$ alkyl, or $C_{1-13}$ alkyloxymethyl; $R_6$ represents hydrogen or methyl; and $R_7$, $R_8$, $R_9$ and $R_{10}$ each represent hydrogen or $C_{1-12}$ alkyl.

2. The thermosetting coating composition according to claim 1, wherein the content ratio of the modified epoxy resin (A) to the blocked polyisocyanate compound (B) is such that the content of the modified epoxy resin (A) is 10 to 90 mass %, and the content of the blocked polyisocyanate compound (B) is 10 to 50 mass %, based on the total mass of resin solids content.

3. The thermosetting coating composition according to claim 1, further comprising a bisphenol skeleton-containing diol (C) having a molecular weight of 280 to 610 represented by Formula (3) below, Formula • (3)

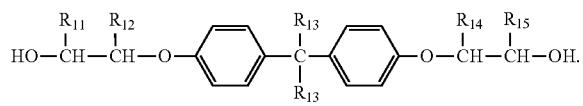

wherein $R_{11}$, $R_{12}$, $R_{14}$ and $R_{15}$ each represent hydrogen, $C_{1-12}$ alkyl, or $C_{1-13}$ alkyloxymethyl; and $R_{13}$ represents hydrogen or methyl.

4. The thermosetting coating composition according to claim 3, wherein the content of the bisphenol skeleton-containing diol (C) is 0.1 to 20 mass %, based on the total resin solids content of the modified epoxy resin (A), the blocked polyisocyanate compound (B) and the bisphenol skeleton-containing diol (C).

5. The thermosetting coating composition according to claim 1, wherein the modified epoxy resin (A) has amino groups, and is neutralized by an acidic compound.

6. A coated article having a coating film resulting from thermosetting of the thermosetting coating composition according to claim 1.

7. A method for forming a cationic electrodeposition coating film, the method comprising immersing a metal substrate in a bath of an electrodeposition coating composition containing the thermosetting coating composition according to claim 1, and energizing the metal substrate as a negative electrode.

8. A method for forming a coated article, the method comprising immersing a metal substrate in a bath of an electrodeposition coating composition containing the thermosetting coating composition according to claim 1; subjecting the immersed metal substrate to an electrodeposition coating; and subjecting the electrodeposition-coated metal substrate to thermosetting.

* * * * *